United States Patent
Yoo et al.

(10) Patent No.: US 10,009,669 B2
(45) Date of Patent: Jun. 26, 2018

(54) OPTICAL TRANSMITTER

(71) Applicant: ELECTRONICS AND TELECOMMUNICATIONS RESEARCH INSTITUTE, Daejeon (KR)

(72) Inventors: Sanghwa Yoo, Daegu (KR); Joon Ki Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days. days.

(21) Appl. No.: 15/469,670

(22) Filed: Mar. 27, 2017

(65) Prior Publication Data

US 2018/0139519 A1    May 17, 2018

(30) Foreign Application Priority Data

Nov. 16, 2016  (KR) ........................ 10-2016-0152420

(51) Int. Cl.
   *H04J 14/00*   (2006.01)
   *H04Q 11/00*   (2006.01)
   *H04B 10/54*   (2013.01)

(52) U.S. Cl.
   CPC ......... *H04Q 11/0005* (2013.01); *H04B 10/54* (2013.01); *H04Q 2011/0018* (2013.01); *H04Q 2011/0024* (2013.01)

(58) Field of Classification Search
   CPC ....... H04Q 11/0005; H04Q 2011/0018; H04Q 2011/0024; H04B 10/54

USPC .......................................................... 398/46
   See application file for complete search history.

(56) References Cited

U.S. PATENT DOCUMENTS

| 5,966,476 A | 10/1999 | Hwang et al. |
| 6,542,655 B1* | 4/2003 | Dragone ............ H04Q 11/0005 385/17 |
| 2007/0146860 A1* | 6/2007 | Kikuchi ................ G02F 1/0123 359/239 |
| 2012/0121264 A1 | 5/2012 | Chung et al. |
| 2014/0178068 A1 | 6/2014 | Sato et al. |
| 2017/0010419 A1* | 1/2017 | Jiang .................. G02B 6/29395 |

FOREIGN PATENT DOCUMENTS

| JP | 2788040 B2 | 8/1998 |
| KR | 10-0198463 B1 | 6/1999 |

OTHER PUBLICATIONS

Shiyi Cao et al. "An Optical Burst Switching Fabric of Multi-Granularity for Petabits/s Multi-Chassis Switches and Routers", Optical Fiber Communication Conference, OFC/NFOEC Technical Digest, 2012.

* cited by examiner

*Primary Examiner* — M. R. Sedighian
(74) *Attorney, Agent, or Firm* — LRK Patent Law Firm

(57) ABSTRACT

An optical transmitter includes an optical modulator configured to modulate an optical signal, a dual-stage space switch configured to receive, as an input, the modulated optical signal from the optical modulator, and output ports configured to control light outputs based on an operation of the dual-stage space switch.

11 Claims, 6 Drawing Sheets

| Switch control signal | | | | | | Dual-stage 1×2 space switch |
|---|---|---|---|---|---|---|
| First sub-space switch | | Second sub-space switch | | Third sub-space switch | | |
| 11A | ON | 21A | ON | 22A | OFF | 21A ON |
| 11B | OFF | 21B | OFF | 22B | ON | 22A OFF |
| 11A | OFF | 21A | OFF | 22A | ON | 21A OFF |
| 11B | ON | 21B | ON | 22B | OFF | 22A ON |
| 11A | ON/OFF | 21A | OFF | 22A | OFF | 21A OFF |
| 11B | OFF/ON | 21B | ON | 22B | ON | 22A OFF |

FIG. 4

FIG. 5

OPTICAL TRANSMITTER

CROSS-REFERENCE TO RELATED APPLICATION

This application claims the benefit of Korean Patent Application No. 10-2016-0152420, filed on Nov. 16, 2016, in the Korean Intellectual Property Office, the disclosure of which is incorporated herein by reference.

BACKGROUND

1. Field of the Invention

One or more example embodiments relate to an optical transmitter.

2. Description of Related Art

To solve issues of current electric switch-based data center networking, for example, a high power consumption, a network delay, a limitation in networking scalability and an increase in networking costs, due to traffic spikes of a data center, research is being conducted on optical switch-based data center networking with a low power, a low latency and scalability.

An optical switching system including a wavelength tunable optical transmitter and an arrayed waveguide grating router (AWGR) may increase a data transmission efficiency by enabling a high-speed optical switching. However, an issue may occur due to an expansion of a switching capability.

SUMMARY

An aspect is to provide a space switch for preventing a wavelength of output light from changing due to heat in a wavelength tunable optical transmitter.

Another aspect is to dramatically enhance a frequency stability of a wavelength tunable optical transmitter while increasing an ON/OFF extinction ratio (ER) using a dual-stage space switch.

According to an aspect, there is provided an optical transmitter including an optical modulator configured to modulate an optical signal, a dual-stage space switch configured to receive, as an input, the modulated optical signal from the optical modulator, and output ports configured to control light outputs based on an operation of the dual-stage space switch.

The dual-stage space switch may include a first sub-space switch configured to receive light output from the optical modulator, a second sub-space switch configured to receive light output from the first sub-space switch, and a third sub-space switch configured to receive light output from the first sub-space switch.

The first sub-space switch may be configured to output light to the second sub-space switch or the third sub-space switch, based on a switch control signal.

The second sub-space switch or the third sub-space switch may be configured to output light via the output ports based on a switch control signal.

The dual-stage space switch may be configured to output light to a first output port connected to the second sub-space switch or a second output port connected to the third sub-space switch based on a switch control signal.

The dual-stage space switch may be configured not to output light to the first output port connected to the second sub-space switch and the second output port connected to the third sub-space switch based on a switch control signal.

The second sub-space switch may be configured to output light to an optical termination via an output port connected to the second sub-space switch when light is not output to the first output port, based on a switch control signal.

The second sub-space switch may be configured not to output light to an optical terminal via an output port connected to the second sub-space switch when light is output to the first output port, based on a switch control signal.

The third sub-space switch may be configured to output light to an optical terminal via an output port connected to the third sub-space switch when light is not output to the second output port, based on a switch control signal.

The third sub-space switch may be configured not to output light to an optical terminal via an output port connected to the third sub-space switch when light is output to the second output port, based on a switch control signal.

The optical signal may be light obtained by amplifying an output light of a fast tunable laser (FTL) at a semiconductor optical amplifier (SOA).

The optical transmitter may further include a controller configured to output a switch control signal to control the dual-stage space switch.

A driving voltage for adjusting an intensity of output light may be applied to the optical modulator.

The driving voltage may be used to control a transmittance and a modulation efficiency of the optical modulator.

The dual-stage space switch may include a first sub-space switch configured to receive light output from the optical modulator, and a second sub-space switch configured to receive light output from the first sub-space switch. The dual-stage space switch may be configured to output light to a first output port connected to the first sub-space switch or a second output port connected to the second sub-space switch based on a switch control signal. The dual-stage space switch may be configured to output light to an optical termination via an output port connected to the second sub-space switch when light is not output to the second output port based on the switch control signal.

According to another aspect, there is provided an optical transmitter including an optical modulator configured to modulate an optical signal output from a FTL or an SOA, a dual-stage space switch configured to receive, as an input, the modulated optical signal from the optical modulator, and output ports configured to control light outputs based on an operation of the dual-stage space switch.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

The following structural or functional descriptions of example embodiments disclosed in the present disclosure are merely intended for the purpose of describing the example embodiments and the example embodiments may be implemented in various forms. The example embodiments are not meant to be limited, but it is intended that various modifications, equivalents, and alternatives are also covered within the scope of the claims.

Although terms of "first," "second," etc. are used to explain various components, the components are not limited to such terms. These terms are used only to distinguish one component from another component. For example, a first component may be referred to as a second component, or similarly, the second component may be referred to as the first component within the scope of the right according to the concept of the present disclosure.

When it is mentioned that one component is "connected" or "coupled" to another component, it may be understood that the one component is directly connected or coupled to another component or that still other component is interposed between the two components.

As used herein, the singular forms are intended to include the plural forms as well, unless the context clearly indicates otherwise. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, example embodiments will be described in detail with reference to the accompanying drawings, and like reference numerals in the drawings refer to like elements throughout.

Figure 1:
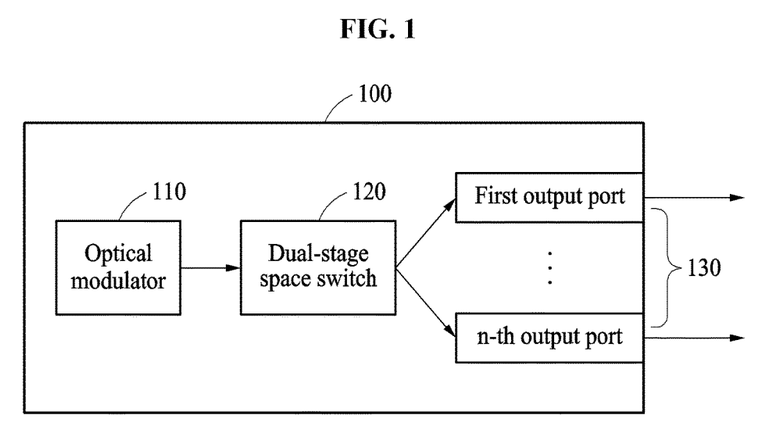
FIG. 1 is a block diagram illustrating an optical transmitter according to an example embodiment.

FIG. 1 is a block diagram illustrating an example of an optical transmitter 100 according to an example embodiment.

Referring to FIG. 1, the optical transmitter 100 may include an optical modulator 110, a dual-stage space switch 120 and output ports 130. The output ports 130 may include, for example, a first output port through an n-th output port. The optical modulator 110, the dual-stage space switch 120, and the output ports 130 may include, but are not limited to, at least one of an optical element, an optical fiber, an electronic circuit, an electric circuit, an integrated circuit, an electronic device or a magnetic element.

The optical modulator 110 may modulate an optical signal. The dual-stage space switch 120 may receive, as an input, the modulated optical signal from the optical modulator 110. The optical signal may be, for example, light obtained by amplifying output light of a fast tunable laser (FTL) at a semiconductor optical amplifier (SOA). Also, the output ports 130 may control light outputs based on an operation of the dual-stage space switch 120.

A driving voltage for adjusting an intensity (or magnitude) of output light may be applied to the optical modulator 110. The driving voltage may be used to control a transmittance and a modulation efficiency of the optical modulator 110. Also, the optical modulator 110 may modulate an optical signal output from the FTL or the SOA.

The dual-stage space switch 120 may include a first sub-space switch 121, a second sub-space switch 122 and a third sub-space switch 123. The first sub-space switch 121 may receive light output from the optical modulator 110. The second sub-space switch 122 may receive light output from the first sub-space switch 121. Also, the third sub-space switch 123 may receive light output from the first sub-space switch 121.

The optical transmitter 100 may further include a controller. The controller may include at least one of an optical element, an optical fiber, an electronic circuit, an electric circuit, an integrated circuit, an electronic device or a magnetic element, however, there is no limitation thereto. The controller may output a switch control signal to control the dual-stage space switch 120.

For example, the optical transmitter 100 may include an FTL and an SOA. In this example, the FTL and the SOA may be integrated as a single chip referred to as an "FTL-SOA." The optical modulator 110 may modulate a data signal that is to be transmitted. An output optical signal of the FTL-SOA of the optical transmitter 100 may be modulated to a data signal by the optical modulator 110. The FTL-SOA may output light with a wavelength $\lambda_1$. Also, the FTL-SOA may output light with a wavelength $\lambda_2$, and may sequentially output light with a wavelength $\lambda_N$. The optical transmitter 100 may determine an output port based on an output wavelength value.

A frequency stability of the optical transmitter 100 may have a tradeoff relationship with a wavelength conversion time. To expand a switching capability in an optical switching system based on the optical transmitter 100, a space switch (SS) may be used. When the space switch is used, path switching may be enabled in a space domain as well as a wavelength domain, which may lead to an increase in the switching capability. In addition, an optical switching system may be implemented without a change in a high frequency stability required by the optical transmitter 100.

Due to introduction of the space switch, a problem that a higher frequency stability is required by the optical transmitter 100 to expand the switching capability may be solved. However, there is a desire for a method of increasing a unique frequency stability of an FTL to increase a wavelength conversion speed.

Figure 2A:
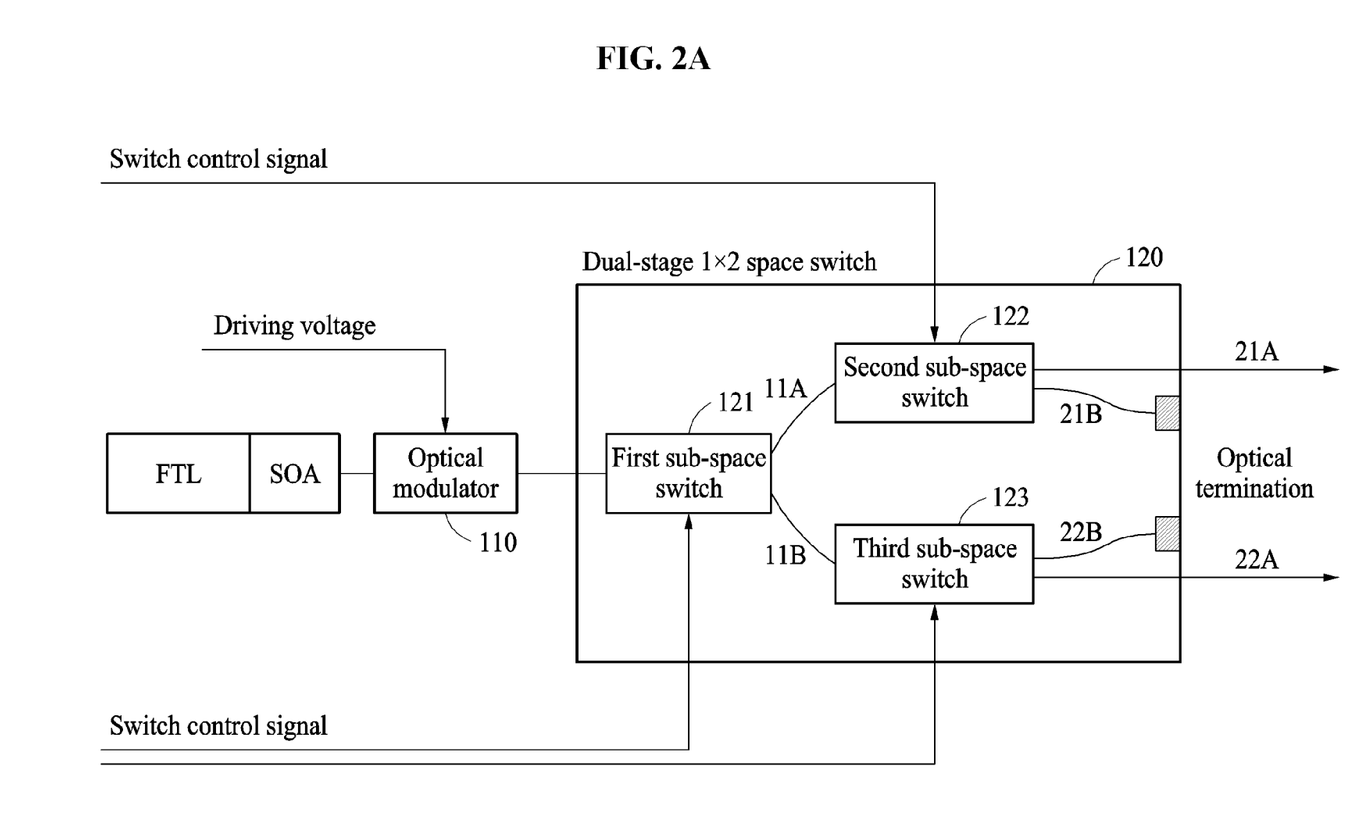
FIG. 2A is a diagram illustrating an example of an optical transmitter including a dual-stage space switch according to an example embodiment.

FIG. 2A is a diagram illustrating an optical transmitter 100 including a dual-stage space switch 120 according to an example embodiment.

FIG. 2A illustrates a configuration of the optical transmitter 100 that uses the dual-stage space switch 120 to solve a problem of a change in a wavelength of output light due to heat.

When an initial wavelength $\lambda_{ini}$ of an FTL is converted to a target wavelength $\lambda_{target}$, intermediate wavelengths between the initial wavelength $\lambda_{ini}$ and the target wavelength $\lambda_{target}$ may be generated. Light with the intermediate wavelengths may be noise in a switching system. To suppress the noise, an SOA may be integrated to the FTL and may function as a shutter to block light.

When a reverse bias current is applied to the SOA during a wavelength conversion time of the FTL, the SOA may operate in a shutter mode to absorb light and may absorb output light of the FTL. When a forward bias current is applied to the SOA in a time during which light of a constant wavelength is output other than the wavelength conversion time, the SOA may amplify an intensity of output light of the FTL.

When the forward bias current applied to the SOA in an amplification mode is converged to the reverse bias current applied to the SOA in the shutter mode, or when the shutter mode is changed to the amplification mode, a large amount of heat may be generated due to many changes in current. Since the FTL and the SOA are integrated into a single chip, heat generated in the SOA may be transferred to the FTL, which may cause a problem that a wavelength output from the FTL fails to reach a target wavelength. To compensate for a wavelength change due to the heat, a feedback wavelength locking circuit may be introduced in the FTL, to improve a frequency stability. However, a wavelength conversion speed of the FTL may decrease. A switching structure for increasing the wavelength conversion speed may be required.

For example, when a high input voltage is applied to a switch used to expand a switching capability using an electrical-to-optical (E/O) conversion device, input light may be output via a port #1, and may be blocked by a port #2. When a low input voltage is applied to the switch, input light may be output via the port #2, and may be blocked by the port #1. In this example, when an extinction ratio (ER) between two outputs is not high, light output via an output port which is not completely blocked may function as noise. Accordingly, a switching structure for solving the above noise problem may be required.

Referring to FIG. 2A, the dual-stage space switch 120 may include a first sub-space switch 121, a second sub-space switch 122 and a third sub-space switch 123. The first sub-space switch 121 may receive light output from an optical modulator 110. The second sub-space switch 122 may receive light output from the first sub-space switch 121. Also, the third sub-space switch 123 may receive light output from the first sub-space switch 121.

For example, the dual-stage space switch 120 as a dual-stage 1×2 SS may be configured with two stages using three sub-space switches 1×2 SS, to increase an ER of two output ports. In this example, when the sub-space switches 1×2 SS have a value of ER, the dual-stage space switch 120 may have a value of $ER^2$.

Output light of the FTL may be amplified at the integrated SOA, and the optical modulator 110 as a modulator may modulate a signal of the amplified output light. When a forward bias current is applied to the SOA, the SOA may operate in the amplification mode. Also, output light of the optical modulator 110 may be input to the dual-stage space switch 120.

The first sub-space switch 121 may output light to the second sub-space switch 122 or the third sub-space switch 123 based on a switch control signal. The second sub-space switch 122 or the third sub-space switch 123 may output light via output ports based on the switch control signal.

The dual-stage space switch 120 may output light to a first output port connected to the second sub-space switch 122 or a second output port connected to the third sub-space switch 123, based on a switch control signal. Depending on circumstances, the dual-stage space switch 120 may not output light to the first output port connected to the second sub-space switch 122 or the second output port connected to the third sub-space switch 123, based on a switch control signal.

When light is not output to the first output port, the second sub-space switch 122 may output light to an optical termination via an output port connected to the second sub-space switch 122, based on a switch control signal. Depending on circumstances, when light is output to the first output port, the second sub-space switch 122 may not output light to the optical termination via the output port connected to the second sub-space switch 122, based on a switch control signal.

When light is not output to the second output port, the third sub-space switch 123 may output light to the optical termination via an output port connected to the third sub-space switch 123, based on a switch control signal. Depending on circumstances, when light is output to the second output port, the third sub-space switch 123 may not output light to the optical termination via the output port connected to the third sub-space switch 123, based on a switch control signal.

The optical transmitter 100 may include a plurality of dual-stage space switches 120. For example, when two dual-stage space switches 120 are provided, the optical transmitter 100 may include a first sub-space switch through a sixth sub-space switch. The first sub-space switch and a fourth sub-space switch may be connected to the optical modulator 110. Output light of the optical modulator 110 may be input to the first sub-space switch or the fourth sub-space switch. Depending on circumstances, the optical modulator 110 may be connected to a specific switch, and the specific switch may be connected to the first sub-space switch or the fourth sub-space switch and may be located to output the output light of the optical modulator 110 by selecting one of the first sub-space switch and the fourth sub-space switch. Also, a second sub-space switch and a third sub-space switch may be connected to the first sub-space switch, and a fifth sub-space switch and the sixth sub-space switch may be connected to the fourth sub-space switch. The second sub-space switch and the third sub-space switch may be connected to a first output port, and the fifth sub-space switch and the sixth sub-space switch may be connected to a fourth output port. In addition, each of the second sub-space switch, the third sub-space switch, the fifth sub-space switch and the sixth sub-space switch may be connected to an optical termination.

The optical transmitter 100 may include a plurality of sub-space switches. For example, the optical transmitter 100 may include a first sub-space switch through a fourth sub-space switch. In this example, the first sub-space switch may be connected to the optical modulator 110. Each of a second sub-space switch through the fourth sub-space switch may be connected to the first sub-space switch. Also, the second sub-space switch through the fourth sub-space switch may be connected to a first output port through a third output port, respectively. Each of the second sub-space switch through the fourth sub-space switch may be connected to an optical termination.

Figure 2B:
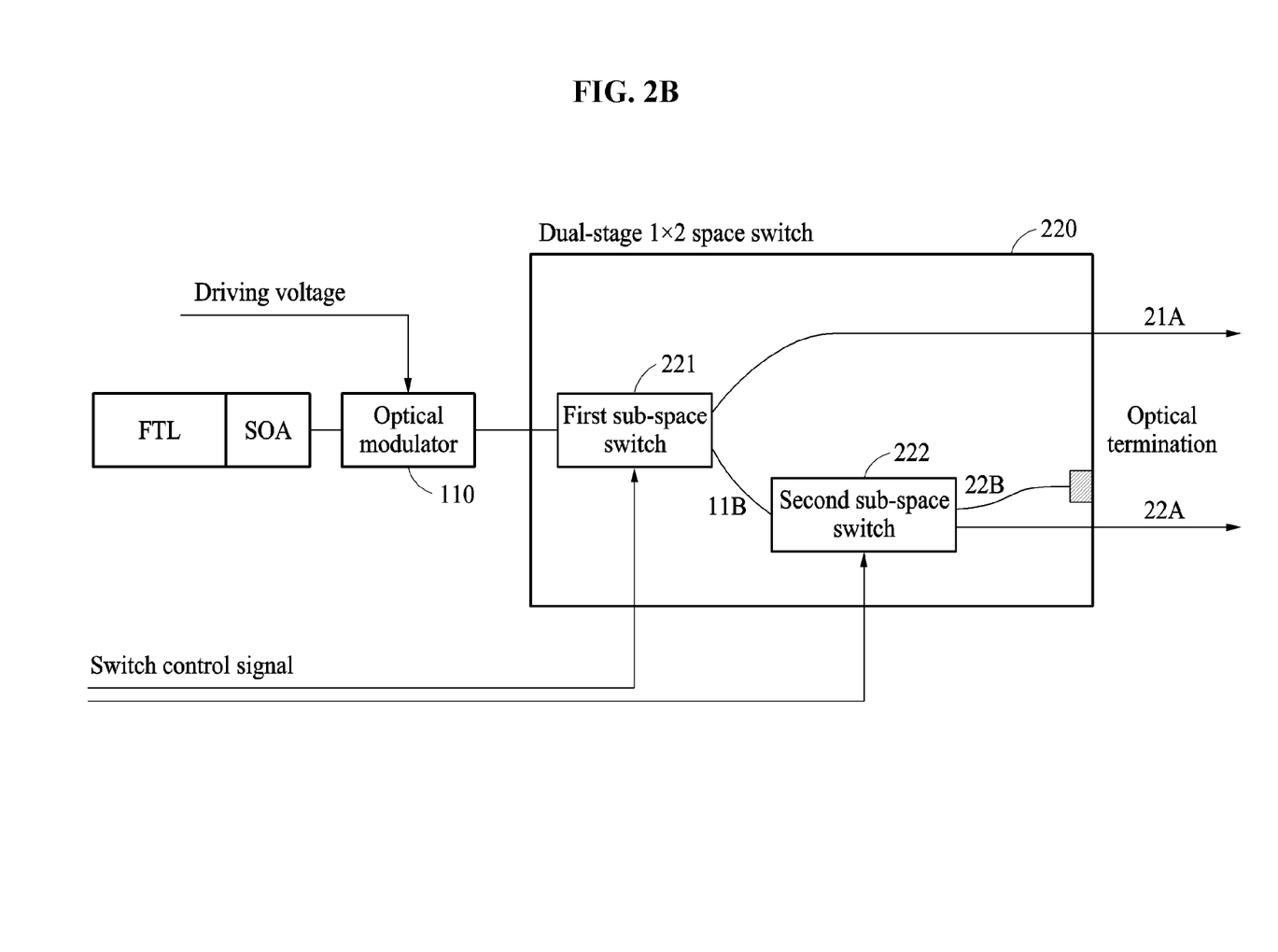
FIG. 2B is a diagram illustrating another example of an optical transmitter including a dual-stage space switch according to an example embodiment.

FIG. 2B is a diagram illustrating an optical transmitter 100 including a dual-stage space switch 220 according to an example embodiment.

Referring to FIG. 2B, when a space switch has a greatly high ON/OFF ER, the optical transmitter 100 may use the dual-stage space switch 220 that includes two space switches, for example, a first sub-space switch 221 and a second sub-space switch 222. The optical transmitter 100 may not use a shutter function of a light amplifier (for example, an SOA) by using the first sub-space switch 221 and the second sub-space switch 222. An output of the first sub-space switch 221 may be connected to an input of the second sub-space switch 222. Accordingly, the optical transmitter 100 may use the dual-stage space switch 220 and may have a structure of using two output ports, for example, output ports 21A and 22A, as output ports and using the other output port, for example, an output port 22B, as an optical termination. A first output port 11B of the first sub-space switch 221 may be connected to the input of the second sub-space switch 222, and a second output port 21A of the first sub-space switch 221 may be used as an output port. Also, a first output port 22A of the second sub-space switch 222 may be used as an output port, and a second output port 22B of the second sub-space switch 222 may be connected to the optical termination.

Figure 3:
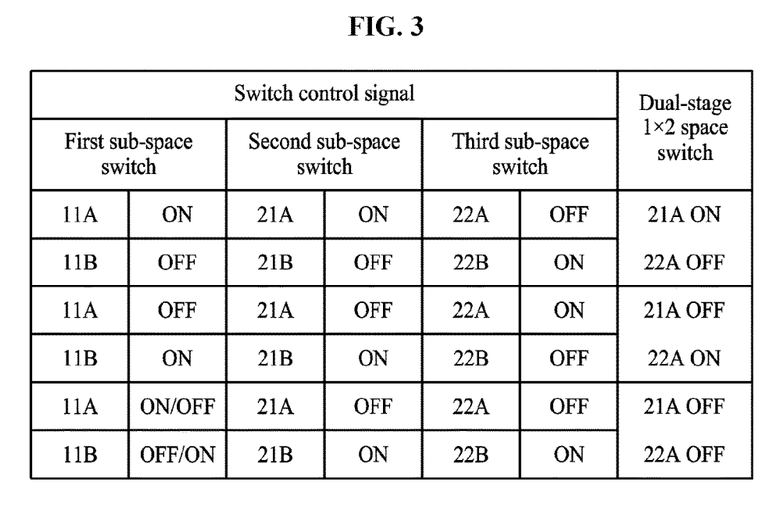
FIG. 3 is a diagram illustrating an operation of a dual-stage space switch of an optical transmitter according to an example embodiment.

FIG. 3 is a diagram illustrating an operation of a dual-stage space switch 120 of an optical transmitter 100 according to an example embodiment.

FIG. 3 illustrates an operating characteristic of the dual-stage space switch 120. To control a light output to an output port 21A of the dual-stage space switch 120 to be ON and control a light output to an output port 22A of the dual-stage space switch 120 to be OFF, a controller of the optical transmitter 100 may control an output of an output port 11A of a first sub-space switch 121 that is a sub-SS11 to be ON and control an output of an output port 11B of the first sub-space switch 121 to be OFF, based on a switch control signal. Also, the controller may control an output of an output port 21A of a second sub-space switch 122 that is a sub-SS21 to be ON and control an output of an output port 21B of the second sub-space switch 122 to be OFF. In addition, the controller may control an output of an output port 22A of a third sub-space switch 123 that is a sub-SS22 to be OFF and control an output of an output port 22B of the third sub-space switch 123 to be ON.

After passing through the first sub-space switch 121, an ER may be obtained. After passing through the second sub-space switch 122 and the third sub-space switch 123, an ER of the output ports 21A and 22A may be $ER^2$. For example, when a sub-space switch sub-SS has an ER of 15 decibels (dB), the dual-stage space switch 120 may have an ER of 30 dB.

To control a light output to the output port 21A of the dual-stage space switch 120 to be OFF and control a light output to the output port 22A to be ON, the controller may control an output of the output port 11A of the first sub-space switch 121 to be OFF and control an output of the output port 11B to be ON, based on a switch control signal. Also, the controller may control an output of the output port 21A of the second sub-space switch 122 to be OFF, may control an output of the output port 21B to be ON, may control an output of the output port 22A of the third sub-space switch 123 to be ON, and may control an output of the output port 22B to be OFF.

The controller may set both two output ports of the dual-stage space switch 120 to be in an OFF state. The controller may control input light of the dual-stage space switch 120 to be output to the output port 21B or 22B connected to an optical termination, based on a switch control signal. To control both the light output to the output port 21A and the light output to the output port 22A to be OFF, the controller may control the output of the output port 11A and the output of the output port 11B to be ON and OFF, respectively, based on a switch control signal. Also, the controller may control the output of the output port 11A and the output of the output port 11B to be OFF and ON, respectively, based on a switch control signal, to control both the light output to the output port 21A and the light output to the output port 22A to be OFF.

Also, the controller may control the output of the output port 21A of the second sub-space switch 122 to be OFF, may control the output of the output port 21B to be ON, may control the output of the output port 22A of the third sub-space switch 123 to be OFF, and may control the output of the output port 22B to be ON.

Accordingly, an effect of blocking input light may occur. When the above state is sued, the optical transmitter 100 may prevent, using the dual-stage space switch 120, an SOA from operating in a shutter mode to block light of an intermediate output wavelength during wavelength conversion in an FTL-SOA. Thus, current for driving an SOA of the optical transmitter 100 may remain unchanged and a temperature may also remain unchanged. Also, the optical transmitter 100 may maintain a constant target wavelength without a change due to heat, which may have an effect of increasing a frequency stability during transmission of wavelength tunable light at a high speed.

Figure 4:
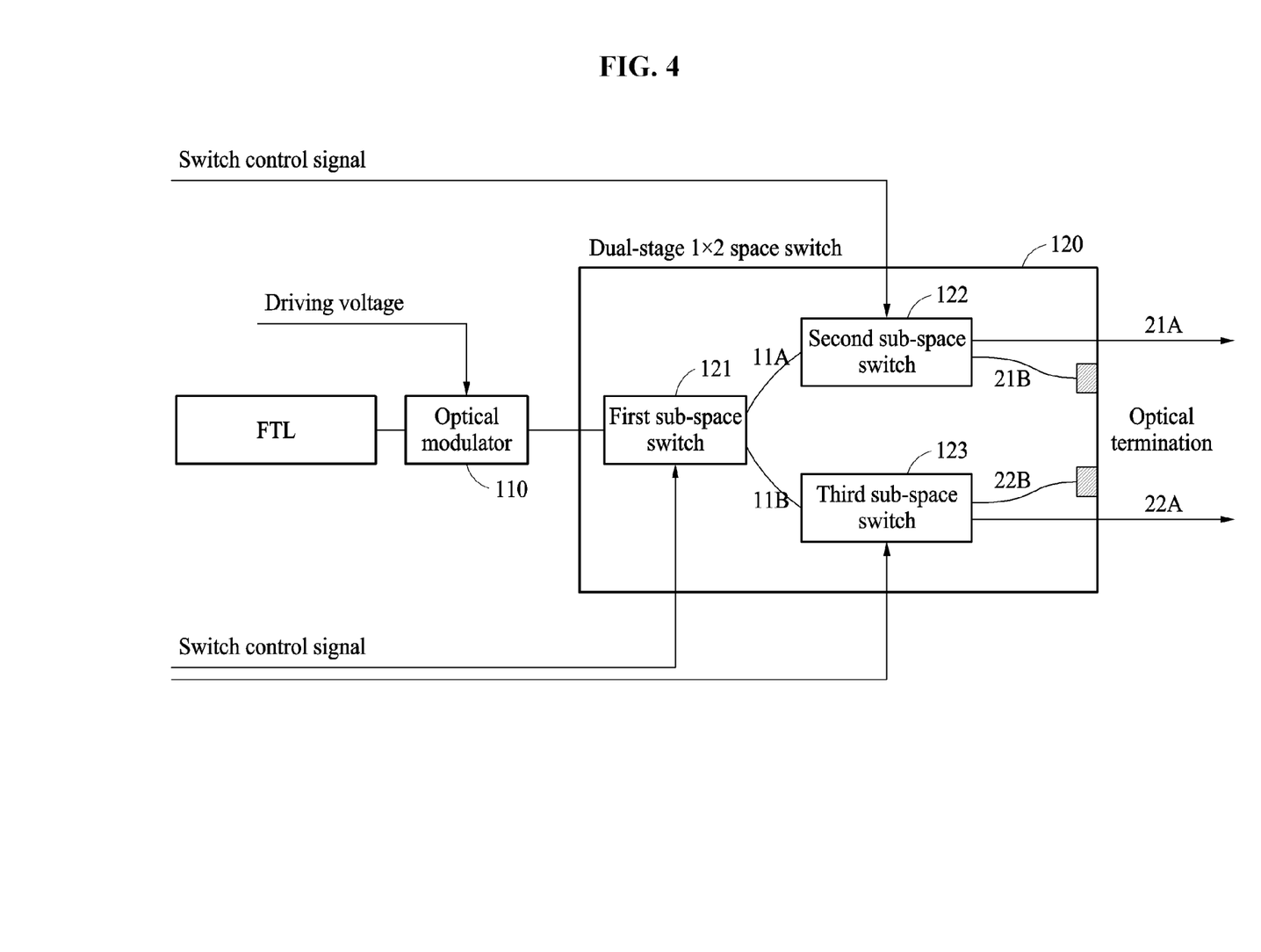
FIG. 4 is a diagram illustrating an optical transmitter using a dual-stage space switch according to an example embodiment.

FIG. 4 is a diagram illustrating an optical transmitter 100 using a dual-stage space switch 120 according an example embodiment.

FIG. 4 illustrates a structure of using an FTL instead of an FTL-SOA chip into which an FTL and an SOA are integrated, in the wavelength tunable optical transmitter 100 that uses the dual-stage space switch 120. For example, when an intensity of output light of the FTL is sufficiently high, the FTL may not need to be integrated with an SOA.

The optical transmitter 100 may increase an ER of a switch to $ER^2$ using the dual-stage space switch 120. Also, the optical transmitter 100 may block all output ports of the dual-stage space switch 120, to suppress a noise component output in response to a wavelength of the FTL being converted. In addition, the optical transmitter 100 may dramatically enhance a frequency stability of the FTL, in comparison to a scheme of using a shutter function of an SOA integrated with an FTL.

Figure 5:
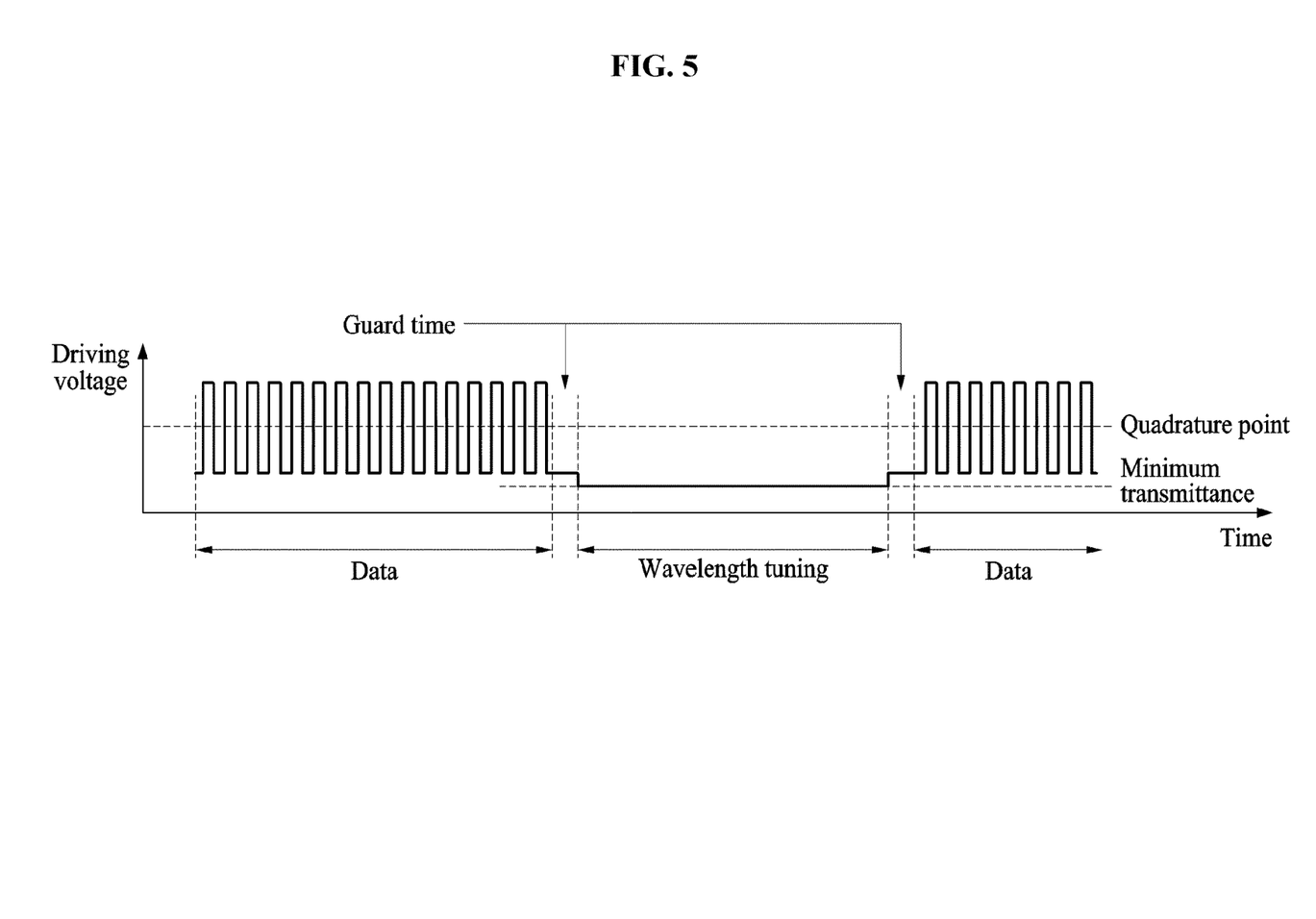
FIG. 5 is a diagram illustrating a driving voltage of an optical modulator in an optical transmitter according to an example embodiment.

FIG. 5 is a diagram illustrating a driving voltage of an optical modulator 110 in an optical transmitter 100 according to an example embodiment.

FIG. 5 illustrates the driving voltage based on a time of the optical modulator 110 in the optical transmitter 100. To additionally block light when all output ports of a dual-stage space switch 120 in the optical transmitter 100 are in an OFF state, an intensity of light may be attenuated using the driving voltage of the optical modulator 110. The optical transmitter 100 may allow the optical modulator 110 to function as an optical attenuator.

For example, a data signal may not be transmitted during a time in which a wavelength is changed in wavelength tuning, and accordingly the optical transmitter 100 may apply a voltage with a minimum intensity of light output by the optical modulator 110 during a wavelength tuning time to the optical modulator 110. Thus, during the wavelength tuning time, a value of a minimum transmittance may be set as the driving voltage.

The optical transmitter 100 may change a signal form of the driving voltage of the optical modulator 110. The optical transmitter 100 may allow the driving voltage to correspond to a quadrature point of the optical modulator 110 during a time in which the data signal is applied, to maximize a modulation efficiency. Also, the optical transmitter 100 may allow an operation at a voltage with a minimum transmittance of the optical modulator 110 during a wavelength tuning time in which a wavelength is converted. In this example, the optical transmitter 100 may additionally set a guard time between a time corresponding to a driving voltage with a maximum modulation efficiency and a time corresponding to a driving voltage with the minimum transmittance to be between a data signal and an OFF signal of the optical modulator 110.

To expand a switching capability in an optical switching system, a system may be implemented by connecting a space switch to an output of a wavelength tunable optical transmitter. The optical switching system may dramatically enhance a frequency stability of the wavelength tunable optical transmitter while increasing an ON/OFF ER using the dual-stage space switch 120.

According to example embodiments, it is possible to prevent a wavelength of output light from changing due to heat using a space switch in a wavelength tunable optical transmitter.

Also, according to example embodiments, it is possible to dramatically enhance a frequency stability of a wavelength tunable optical transmitter while increasing an ON/OFF ER using a dual-stage space switch, in order to expand a switching capability.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical transmitter comprising:
an optical modulator configured to modulate an optical signal;
a dual-stage space switch configured to receive, as an input, the modulated optical signal from the optical modulator; and
output ports configured to control light outputs based on an operation of the dual-stage space switch,
wherein the dual-stage space switch comprises:
a first sub-space switch configured to receive light output from the optical modulator;
a second sub-space switch configured to receive light output from the first sub-space switch; and
a third sub-space switch configured to receive light output from the first sub-space switch, wherein the dual-stage space switch is configured not to output light to the first output port connected to the second sub-space switch and the second output port connected to the third sub-space switch based on a switch control signal.

2. The optical transmitter of claim 1, wherein the first sub-space switch is configured to output light to the second sub-space switch or the third sub-space switch, based on a switch control signal.

3. The optical transmitter of claim 1, wherein the second sub-space switch or the third sub-space switch is configured to output light via the output ports based on a switch control signal.

4. The optical transmitter of claim 1, wherein the dual-stage space switch is configured to output light to a first output port connected to the second sub-space switch or a second output port connected to the third sub-space switch based on a switch control signal.

5. The optical transmitter of claim 1, wherein the optical signal is light obtained by amplifying an output light of a fast tunable laser (FTL) at a semiconductor optical amplifier (SOA).

6. The optical transmitter of claim 1, further comprising:
a controller configured to output a switch control signal to control the dual-stage space switch.

7. The optical transmitter of claim 1, wherein a driving voltage for adjusting an intensity of output light is applied to the optical modulator.

8. The optical transmitter of claim 7, wherein the driving voltage is used to control a transmittance and a modulation efficiency of the optical modulator.

9. An optical transmitter comprising:
an optical modulator configured to modulate an optical signal;
a dual-stage space switch configured to receive, as an input, the modulated optical signal from the optical modulator; and
output ports configured to control light outputs based on an operation of the dual-stage space switch,
wherein the dual-stage space switch comprises:
a first sub-space switch configured to receive light output from the optical modulator;
a second sub-space switch configured to receive light output from the first sub-space switch; and
a third sub-space switch configured to receive light output from the first sub-space switch,
wherein the dual-stage space switch is configured to output light to a first output port connected to the second sub-space switch or a second output port connected to the third sub-space switch based on a switch control signal,
wherein the second sub-space switch is configured to output light to an optical termination via an output port connected to the second sub-space switch when light is not output to the first output port, based on a switch control signal or the second sub-space switch is configured not to output light to the optical termination via an output port connected to the second sub-space switch when light is output to the first output port, based on a switch control signal.

10. An optical transmitter comprising:
an optical modulator configured to modulate an optical signal;
a dual-stage space switch configured to receive, as an input, the modulated optical signal from the optical modulator; and
output ports configured to control light outputs based on an operation of the dual-stage space switch,
wherein the dual-stage space switch comprises:
a first sub-space switch configured to receive light output from the optical modulator;
a second sub-space switch configured to receive light output from the first sub-space switch; and
a third sub-space switch configured to receive light output from the first sub-space switch,
wherein the dual-stage space switch is configured to output light to a first output port connected to the second sub-space switch or a second output port connected to the third sub-space switch based on a switch control signal,
wherein the third sub-space switch is configured to output light to an optical terminal via an output port connected to the third sub-space switch when light is not output to the second output port, based on a switch control signal or the third sub-space switch is configured not to output light to the optical terminal via the output port connected to the third sub-space switch when light is output to the second output port, based on the switch control signal.

11. An optical transmitter comprising:
an optical modulator configured to modulate an optical signal;
a dual-stage space switch configured to receive, as an input, the modulated optical signal from the optical modulator; and
output ports configured to control light outputs based on an operation of the dual-stage space switch, wherein the dual-stage space switch comprises:
a first sub-space switch configured to receive light output from the optical modulator; and
a second sub-space switch configured to receive light output from the first sub-space switch,
wherein the dual-stage space switch is configured to output light to a first output port connected to the first sub-space switch or a second output port connected to the second sub-space switch based on a switch control signal, and
wherein the dual-stage space switch is configured to output light to an optical termination via an output port connected to the second sub-space switch when light is not output to the second output port based on the switch control signal.

* * * * *